US009513506B2

(12) United States Patent
Choi et al.

(10) Patent No.: US 9,513,506 B2
(45) Date of Patent: Dec. 6, 2016

(54) TRANSFLECTIVE LIQUID CRYSTAL PANEL, DISPLAY DEVICE, ARRAY SUBSTRATE, COLOR FILTER SUBSTRATE AND FABRICATING METHOD THEREOF

(71) Applicant: BOE TECHNOLOGY GROUP CO., LTD., Beijing (CN)

(72) Inventors: Hyun Sic Choi, Beijing (CN); Hui Li, Beijing (CN); Zhiqiang Xu, Beijing (CN); Yoon Sung Um, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 37 days.

(21) Appl. No.: 14/380,845

(22) PCT Filed: Dec. 13, 2013

(86) PCT No.: PCT/CN2013/089322
§ 371 (c)(1),
(2) Date: Aug. 25, 2014

(87) PCT Pub. No.: WO2014/190730
PCT Pub. Date: Dec. 4, 2014

(65) Prior Publication Data
US 2015/0323834 A1 Nov. 12, 2015

(30) Foreign Application Priority Data

May 27, 2013 (CN) .......................... 2013 1 0201754

(51) Int. Cl.
*G02F 1/1335* (2006.01)
*G02F 1/13363* (2006.01)
(Continued)

(52) U.S. Cl.
CPC ....... *G02F 1/133555* (2013.01); *G02F 1/1337* (2013.01); *G02F 1/13363* (2013.01);
(Continued)

(58) Field of Classification Search
CPC ................... G02F 1/133514; G02F 1/133528; G02F 1/133555; G02F 1/13363; G02F 1/1337; G02F 1/134309; G02F 1/13439; G02F 2001/133638; G02B 5/201
(Continued)

(56) References Cited

U.S. PATENT DOCUMENTS 7,133,095 B2 * 11/2006 Kang ................ G02F 1/133514
349/106
7,379,138 B2 5/2008 Tung et al.
(Continued)

FOREIGN PATENT DOCUMENTS

CN 1645230 A 7/2005
CN 1760723 A 4/2006
(Continued)

OTHER PUBLICATIONS

English translation of the Written Opinion of the International Searching Authority of PCT/CN2013/089322, mailed Mar. 20, 2014.
(Continued)

*Primary Examiner* — Donald Raleigh
*Assistant Examiner* — Kevin Quarterman
(74) *Attorney, Agent, or Firm* — Collard & Roe, P.C.

(57) ABSTRACT

A transflective liquid crystal display panel, a display device, an array substrate, a color filter substrate and a fabrication method thereof are provided. The transflective liquid crystal display panel comprises a first substrate (11), a second substrate (21) arranged opposite to the first substrate (11), and a liquid crystal layer (31) disposed between the first substrate (11) and the second substrate (21). The liquid crystal display panel comprises a plurality of pixel units, each pixel unit comprises a transmissive region and a reflective region, and a thickness (d1) of the liquid crystal
(Continued)

layer (31) in the transmissive region is equal to a thickness (d2) of the liquid crystal layer (31) in the reflective region. On a side facing the liquid crystal layer (31), the first substrate (11) is provided with a first common electrode (12) corresponding to the reflective region and the transmissive region and a second common electrode (15) corresponding to the transmissive region. The second substrate (21) is provided with a pixel electrode (23) corresponding to the transmissive region and the reflective region on a side facing the liquid crystal layer (31), and the second substrate (21) is provided with a reflective layer (22) corresponding to the reflective region on the side facing the liquid crystal layer (31), and the reflective layer (22) is provided below the pixel electrode (23) of the reflective region. A first electric field intensity (E1) between the second common electrode (15) and the pixel electrode (23) of the transmissive region is twice a second electric field intensity (E2) between the first common electrode (12) and the pixel electrode (23) of the reflective region.

15 Claims, 4 Drawing Sheets

(51) Int. Cl.
  *G02F 1/1343* (2006.01)
  *G02F 1/1337* (2006.01)
  *G02B 5/20* (2006.01)
(52) U.S. Cl.
  CPC .... *G02F 1/13439* (2013.01); *G02F 1/133514* (2013.01); *G02F 1/133528* (2013.01); *G02F 1/134309* (2013.01); *G02F 1/134363* (2013.01); *G02B 5/201* (2013.01); *G02F 2001/133638* (2013.01); *G02F 2001/134318* (2013.01)
(58) Field of Classification Search
  USPC .......... 349/33, 106, 113, 114, 137, 141, 187
  See application file for complete search history.

(56) References Cited

U.S. PATENT DOCUMENTS

| 7,751,001 | B2 | 7/2010 | Ge et al. | |
| 2005/0140862 | A1* | 6/2005 | Jang | G02F 1/133711 349/113 |
| 2006/0050218 | A1* | 3/2006 | Baek | G02F 1/133555 349/141 |
| 2006/0170846 | A1* | 8/2006 | Ozawa | G02F 1/1393 349/114 |
| 2007/0076157 | A1 | 4/2007 | Wang et al. | |
| 2008/0068542 | A1* | 3/2008 | Tanaka | G02F 1/133512 349/113 |
| 2008/0074588 | A1* | 3/2008 | Sekiguchi | G02F 1/133555 349/106 |
| 2008/0151156 | A1* | 6/2008 | Ino | G02F 1/133555 349/113 |
| 2008/0186436 | A1* | 8/2008 | Chu | G02F 1/133788 349/114 |
| 2008/0273130 | A1* | 11/2008 | Tung | G02F 1/136227 349/38 |
| 2009/0033813 | A1* | 2/2009 | Fan Jiang | G02F 1/133555 349/33 |
| 2010/0110351 | A1 | 5/2010 | Kim et al. | |
| 2010/0139856 | A1 | 6/2010 | Lin et al. | |

FOREIGN PATENT DOCUMENTS

| CN | 101324719 A | | 12/2008 |
| CN | 101393335 A | * | 3/2009 |
| CN | 202693962 U | | 1/2013 |
| CN | 102944958 A | | 2/2013 |
| CN | 202748576 U | | 2/2013 |
| CN | 103278975 A | | 9/2013 |
| CN | 203250092 U | | 10/2013 |
| JP | H0862586 A | | 3/1996 |

OTHER PUBLICATIONS

Second Chinese Office Action of Chinese Application No. 201310201754.9, mailed Sep. 28, 2015 with English translation.
English Translation of the International Search Report of PCT/CN2013/089322 published in English on Dec. 4, 2014.
Chinese Office Action of Chinese Application No. 201310201754.9, mailed Apr. 8, 2015 with English translation.
International Search Report, International Preliminary Report on Patentability and Written Opinion of the International Searching Authority of PCT/CN2013/089322 in Chinese, mailed Mar. 20, 2014.
English translation of the International Preliminary Report on Patentability and Written Opinion of the International Searching Authority of PCT/CN2013/089322, issued Dec. 1, 2015.

* cited by examiner

| Result | Bright state | Dark state |
|---|---|---|
| Outputting light | ↕ | |
| First polarizer (90 degrees) | ↕ | |
| λ/4 phase delay film of the first polarizer | ↕ | ↔ |
| Liquid crystal layer (λ/2) | ○ | ○ |
| λ/4 phase delay film of the second polarizer | ○ | |
| Second polarizer (0 degree) | ↔ | |
| Inputting backlight | ✴ | |

TRANSFLECTIVE LIQUID CRYSTAL PANEL, DISPLAY DEVICE, ARRAY SUBSTRATE, COLOR FILTER SUBSTRATE AND FABRICATING METHOD THEREOF

CROSS REFERENCE TO RELATED APPLICATIONS

This application is the National Stage of PCT/CN2013/089322 filed on Dec. 13, 2013, which claims priority under 35 U.S.C. §119 of Chinese Application No. 201310201754.9 filed on May 27, 2013, the disclosure of which is incorporated by reference.

TECHNICAL FIELD

Embodiments of the disclosure relate to a transflective liquid crystal panel, a display device, an array substrate, a color filter substrate and a fabrication method.

BACKGROUND

The liquid crystal display panel may be divided, according to light source, into a reflective type, a transmissive type, and a transflective type. The reflective liquid crystal display panel takes ambient light around the liquid crystal display panel as the light source, and is provided with a reflective layer for reflecting the ambient light. The reflective liquid crystal display panel, due to lack of a backlight, is relatively low in power consumption, but the image displayed by the reflective liquid crystal display panel is not easily distinguished in the case that the surrounding ambient light is dim.

The transmissive liquid crystal display panel is provided with a backlight on a rear side of a thin film transistor array substrate of the liquid crystal display panel; the light from the backlight passes through the liquid crystal display panel to display desired images.

The transflective liquid crystal display panel may be deemed as a combination of the transmissive liquid crystal display panel and the reflective liquid crystal display panel, which is not only provided with a reflective region but also a transmissive region, and is capable of simultaneously adopting the backlight and the ambient light for display.

The transflective liquid crystal display panel integrates advantages of the transmissive liquid crystal display panel and the reflective liquid crystal display panel, and is suitable for both indoor use to display bright images under dark environment and outdoor use. Therefore, the transflective liquid crystal display panel is widely applied to display devices of portable mobile electronic products.

At present, the liquid crystal display panel may be divided, according to display mode, into a Twisted Nematic (TN) type, an In Plane Switching (IPS) type, and an Advanced Super Dimension Switch (ADS) type, etc. For the liquid crystal display panel of ADS mode, a multi-dimensional electric field is formed with both an electric field generated at edges of slit electrodes in a same plane and an electric field generated between a slit electrode layer and a plate-like electrode layer, so that liquid crystal molecules at all orientations, which are located directly above the electrodes or between the slit electrodes in a liquid crystal cell, can be rotated. Compared with the liquid crystal display panel of IPS mode, the liquid crystal display panel of ADS mode has advantages of high image quality, high resolution, high transmittance, low power consumption, wide viewing angle, high aperture ratio, low chromatic aberration, free of push Mura, etc.

SUMMARY

Embodiments of the disclosure provide a transflective liquid crystal display panel. The transflective liquid crystal display panel comprises a first substrate, a second substrate arranged opposite to the first substrate, and a liquid crystal layer disposed between the first substrate and the second substrate. The liquid crystal display panel comprises a plurality of pixel units, each pixel unit comprises a transmissive region and a reflective region, and a thickness of the liquid crystal layer in the transmissive region is equal to a thickness of the liquid crystal layer in the reflective region. On a side facing the liquid crystal layer, the first substrate is provided with a first common electrode corresponding to the reflective region and the transmissive region and a second common electrode corresponding to the transmissive region. The second substrate is provided with a pixel electrode corresponding to the transmissive region and the reflective region on a side facing the liquid crystal layer, and the second substrate is provided with a reflective layer corresponding to the reflective region on the side facing the liquid crystal layer, and the reflective layer is provided below the pixel electrode of the reflective region. A first electric field intensity between the second common electrode and the pixel electrode of the transmissive region is twice a second electric field intensity between the first common electrode and the pixel electrode of the reflective region.

For example, the pixel electrode in the pixel unit comprises a plurality of pixel electrodes arranged at intervals, and two adjacent pixel electrodes are equal in voltage magnitude and opposite in voltage polarity.

For example, a color filter film is provided on a side of the first common electrode facing the liquid crystal layer; and the second common electrode is provided on a side of the color filter film facing the liquid crystal layer.

For example, a color filter film is provided on a side of the first common electrode facing the liquid crystal layer; a transmissive layer is provided on a side of the color filter film facing the liquid crystal layer; the second common electrode is provided on a side of the transmissive layer facing the liquid crystal layer.

For example, the first substrate is further provided with a first polarizer on a side away from the liquid crystal layer; and the second substrate is further provided with a second polarizer on a side away from the liquid crystal layer.

For example, a light transmission axis of the first polarizer is perpendicular to that of the second polarizer.

For example, both the first polarizer and the second polarizer are polarizers with a λ/4 phase delay films built therein.

For example, the pixel electrodes are strip-shaped electrodes.

For example, a first orientation layer is provided on a side of the first substrate facing the liquid crystal layer and the first orientation layer corresponds to the transmissive region and reflective region and covers the second common electrode; and a second orientation layer is provided on a side of the second substrate facing the liquid crystal layer and the second orientation layer corresponds to the transmissive region and reflective region and covers the pixel electrode.

Embodiments of the disclosure provide a display device. The display device comprises a transflective liquid crystal display panel as described above.

Embodiments of the disclosure provide a color filter substrate. The color filter substrate comprises: a base substrate; a first common electrode, provided on a side of the base substrate facing the liquid crystal layer and corresponding to a reflective region and a transmissive region; a second common electrode, corresponding to the transmissive region; and a color filter film, provided on a side of the first common electrode facing the liquid crystal layer.

For example, the second common electrode is provided on a side of the color filter film facing the liquid crystal layer.

For example, the color filter substrate further comprises: a transmissive layer provided on a side of the color filter film facing the liquid crystal layer; and the second common electrode is provided on a side of the transmissive layer facing the liquid crystal layer.

Embodiments of the disclosure provide an array substrate. The array substrate comprises plurality of pixel units. A plurality of pixel electrodes are provided in each pixel unit at intervals, and two adjacent pixel electrodes are equal in voltage magnitude and opposite in voltage polarity. A reflective layer is provided in a reflective region of the pixel unit, and the pixel electrodes of the reflective region are provided on the reflective layer.

Embodiments of the disclosure provide a method for fabricating a color filter substrate. The method comprises: providing a base substrate; forming a first common electrode and a color filter film in a transmissive region and a reflective region of the base substrate; and forming a second common electrode in the transmissive region of the base substrate.

For example, the step of forming the first common electrode and the color filter film in the transmissive region and the reflective region of the base substrate comprises: forming the first common electrode in the transmissive region and the reflective region of the base substrate; and forming the color filter film on the first common electrode.

For example, the step of forming the second common electrode in the transmissive region of the base substrate comprises: forming the second common electrode on the color filter film in the transmissive region.

For example, before the step of forming the second common electrode in the transmissive region of the base substrate, the method further comprises: forming a transmissive layer on the color filter film; and the step of forming the second common electrode in the transmissive region of the base substrate comprises: forming the second common electrode on the transmissive layer in the transmissive region.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DESCRIPTION OF THE EMBODIMENTS

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

It should be noted that description hereinafter is made for a single pixel unit, but other pixel units can be formed in the same way.

Figure 1:
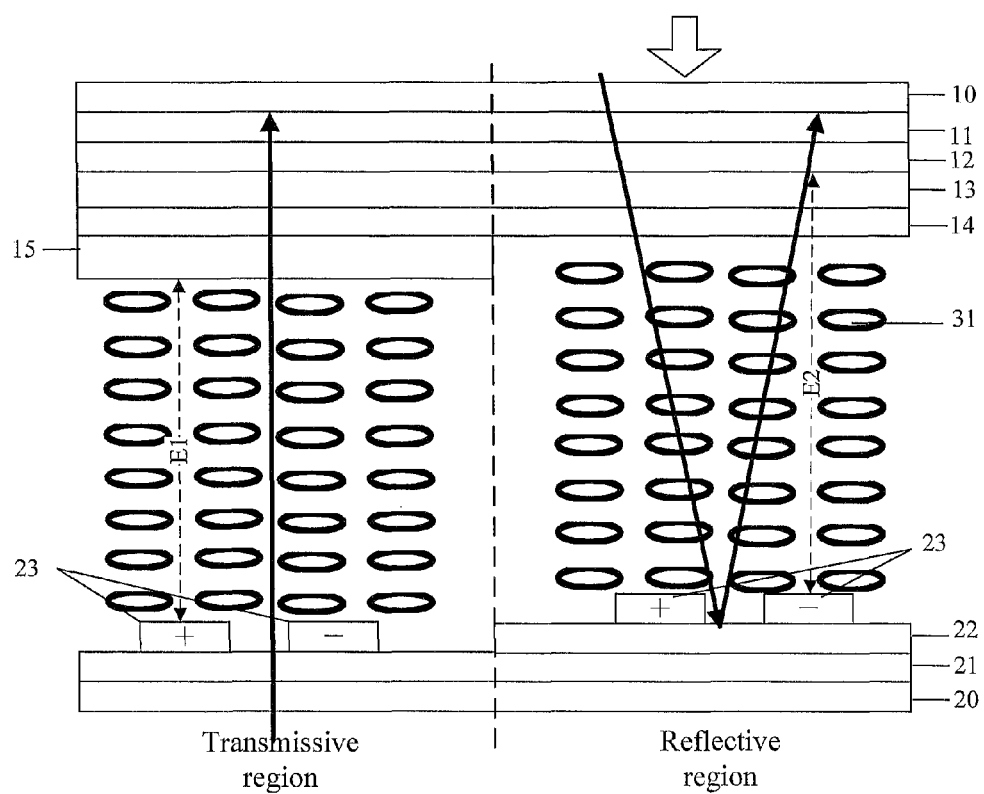
FIG. 1 is a structural schematic view illustrating a transflective liquid crystal display panel according to the embodiments of the disclosure in the case that no electric field is applied.

As shown in FIG. 1, a transflective liquid crystal display panel according to the embodiments of the disclosure comprises a first substrate 11, wherein for example, the first substrate 11 is a color filter substrate; a second substrate 21 which is arranged opposite to the first substrate 11, wherein for example, the second substrate 21 is an array substrate, preferably a thin film transistor array substrate; and a liquid crystal layer 31 arranged between the first substrate 11 and the second substrate 21. The transflective liquid crystal display panel comprises a plurality of pixel units, each pixel unit comprises a transmissive region and a reflective region, and a thickness d1 of the liquid crystal layer of the transmissive region is equal to a thickness d2 of the liquid crystal layer of the reflective region, i.e., d1=d2.

On a side facing the liquid crystal layer 31, the first substrate 11 is provided with a first common electrode 12 corresponding to the reflective region and the transmissive region and a second common electrode 15 corresponding to the transmissive region.

The second substrate 21 is provided with a pixel electrode corresponding to the transmissive region and the reflective region on a side facing the liquid crystal layer 31. For example, a plurality of pixel electrodes 23 are provided at intervals; and two adjacent pixel electrodes are equal in voltage magnitude and opposite in voltage polarity. For example, the pixel electrodes are strip-shaped electrodes. In addition, the pixel electrodes may be electrodes in other regular shapes.

The second substrate 21 is provided with a reflective layer 22 corresponding to the reflective region; and the reflective layer 22 is arranged below the pixel electrode 23 of the reflective region.

An intensity E1 of a first electric field between the second common electrode 15 and the pixel electrode 23 of the transmissive region is twice an intensity E2 of a second electric field between the first common electrode 12 and the pixel electrode 23 of the reflective region, i.e., E1=2×E2.

When the liquid crystal display panel according to the embodiments of the disclosure displays an image, a phase delay amount generated by the liquid crystal layer of the transmissive region is $d1 \times \Delta n1$, and a phase delay amount generated by the liquid crystal layer of the reflective region is $2 \times d2 \times \Delta n2$, where $\Delta n1$ and $\Delta n2$ respectively represent phase delays of light passing through the liquid crystal layer in the transmissive region and the reflective region; d1 is the thickness of the liquid crystal layer of the transmissive region and also is an optical path length of the transmissive region, i.e., a distance of light passing through the liquid crystal layer of the transmissive region; d2 is the thickness of the liquid crystal layer of the reflective region; 2×d2 is an optical path length of external ambient light passing through the liquid crystal layer of the reflective region.

To realize transflective display, the phase delay amount generated by light passing through the liquid crystal layer of the transmissive region should match with the phase delay amount generated by light passing through the liquid crystal layer of the transmissive region, i.e., d1×Δn1=2×d2×Δn2. Since d1=d2, it is necessary that Δn1=2×Δn2. In the embodiments of the disclosure, because the first electric field intensity E1 between the second common electrode 15 and the pixel electrode 23 of the transmissive region is twice the second electric field intensity E2 between the first common electrode 12 and the pixel electrode 23 of the reflective region, i.e., E1=2×E2, the delay Δn1 of the liquid crystal layer of the transmissive region under the first electric field intensity E1 is twice the delay Δn2 of the liquid crystal layer of the reflective region under the second electric field intensity E2. That is to say, because E1=2×E2, Δn1=2×Δn2. In view of the overall effect, Δn1×d1=2×Δn2×d2, the phase delay amount of the liquid crystal layer of the transmissive region matches with the phase delay amount of the liquid crystal layer of the reflective region, and the transflective display effect is finally achieved.

In addition, when voltages equal in magnitude and opposite in polarity are applied to two adjacent pixel electrodes 23 in the pixel unit, uniform and stable image can be realized, the reasons thereof are as follows.

By applying voltages equal in magnitude and opposite in polarity to two adjacent data lines of a same pixel unit of the array substrate, a voltage signal of a first intensity is transmitted to the pixel electrode from a first data line of the two data lines through a TFT (thin film transistor) and a voltage signal of a second intensity is transmitted to the pixel electrode from a second data line of the two data lines through the TFT, and the voltage signal of the first intensity and the voltage signal of the second intensity are equal in electric magnitude and opposite in polarity. In this way, the coupling capacitance generated between the first data line and the pixel electrode is equal to the coupling capacitance generated between the second data line and the pixel electrode. Because the voltage signal of the first intensity is opposite to the voltage signal of the second intensity in polarity, if the voltage of the pixel electrode is increased due to a jump voltage caused by the first coupling capacitance generated between the first data line and the pixel electrode, the voltage of the pixel electrode is reduced due to a jump voltage caused by the second coupling capacitance generated between the second data line and the pixel electrode, and the jump voltage of the pixel voltage caused by the first coupling capacitance offsets the jump voltage of the pixel voltage caused by the second coupling capacitance. Thus, the voltage of the pixel electrode tends to be stable, and an uneven image display caused by the jump voltage generated by the coupling capacitance between the data line and the pixel electrode is avoided.

To realize E1=2×E2, according to the formula E=U/d (d represents distance between two points along an electric field direction and U is a voltage between two points along the electric field direction), the voltage applied between the pixel electrode and the second common electrode 15 in the transmissive region is twice the voltage applied between the pixel electrode and the first common electrode 12 in the reflective region; or the distance between the pixel electrode and the second common electrode 15 in the transmissive region is ½ of the distance between the pixel electrode and the first common electrode 12 in the reflective region.

For example, the purpose that the distance between the pixel electrode and the second common electrode 15 in the transmissive region is ½ of the distance between the pixel electrode and the first common electrode 12 in the reflective region is realized in ways as follows:

A first way: a color filter film 13 is provided on a side of the first common electrode 12 facing the liquid crystal layer; the second common electrode 15 is arranged on a side of the color filter film 13 facing the liquid crystal layer; by regulating a thickness of the color filter film 13, the distance between the pixel electrode and the second common electrode 15 in the transmissive region is ½ of the distance between the pixel electrode and the first common electrode 12 in the reflective region;

A second way: the color filter film 13 is provided on the side of the first common electrode 12 facing the liquid crystal layer; a transmissive layer 14 is further provided on a side of the color filter film 13 facing the liquid crystal layer; the second common electrode 15 is arranged on a side of the transmissive layer 14 facing the liquid crystal layer; by regulating a thickness of the color filter film and a thickness of the transmissive layer, the distance between the pixel electrode and the second common electrode 15 in the transmissive region is ½ of the distance between the pixel electrode and the first common electrode 12 in the reflective region.

In the above two implementation ways, for example, the thickness of the color filter film is 2.5 μm, and the thickness of the transmissive layer 14 is 1.5 μm to 3 μm.

For example, the first substrate 11 is further provided with a first polarizer 10 on a side away from the liquid crystal layer; the second substrate 21 is further provided with a second polarizer 20 on a side away from the liquid crystal layer. A light transmission axis of the first polarizer 10 is perpendicular to that of the second polarizer 20, for example, the first polarizer 10 and the second polarizer 20 are a 90-degree polarizer and a 0-degree polarizer respectively. In addition, for example, the first polarizer 10 and the second polarizer 20 are polarizers with λ/4 phase delay films built therein. The λ/4 phase delay films are arranged on a side of the first polarizer 10 facing the first substrate 11 and a side of the second polarizer 20 facing the second substrate 21.

In the liquid crystal display panel as described above, in the case that an electric field is not applied between the pixel electrode and the common electrode, liquid crystal molecules in the liquid crystal layer are oriented in parallel along a direction of the light transmission axis of the first polarizer 10 or the second polarizer 20 (as shown in FIG. 1), i.e., in the case that the electric field is not applied, the liquid crystal molecules do not deflect and will not delay light passing through thereof. In addition, because merely linear polarized light consistent with the direction of the light transmission axis of the polarizer pass through the polarizer, the liquid crystal display panel is in a dark state in the case that the electric field is not applied.

It should be noted that, the number of the data lines in the same pixel unit of the array substrate is not limited, as long as voltages applied on adjacent pixel electrodes are equal in magnitude and opposite in polarity. The embodiments just describe a case of two data lines as an example.

Figure 2:
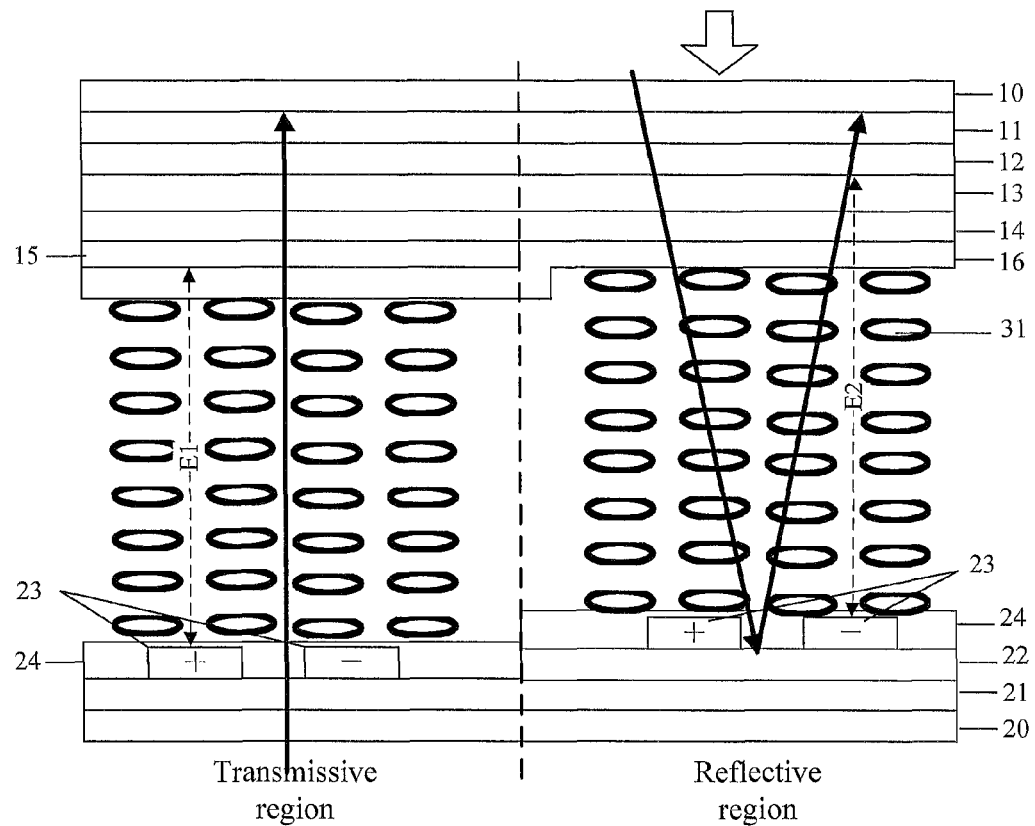
FIG. 2 is another structural schematic view illustrating the transflective liquid crystal display panel according to the embodiments of the disclosure in the case that no electric field is applied.

Furthermore, as shown in FIG. 2, in order to keep a rapid axis direction of the liquid crystal molecules in the liquid crystal layer parallel with the light transmission axis of the first polarizer 10 or the second polarizer 20, a first orientation layer 16 is provided on a side of the first substrate 11 facing the liquid crystal layer and the first orientation layer 16 corresponds to the transmissive region and reflective region and covers the second common electrode 15; and a second orientation layer 24 is further provided on a side of the second substrate 21 facing the liquid crystal layer and the second orientation layer 24 corresponds to the transmissive region and reflective region and covers the pixel electrode.

For example, orientation directions of the first orientation layer 16 and the second orientation layer 24 are set to be consistent with the light transmission axis of the first polarizer 10, i.e., the orientation directions of the first orientation layer 16 and the second orientation layer 24 are perpendicular to the light transmission axis of the second polarizer 20. Alternatively, the orientation directions of the first orientation layer 16 and the second orientation layer 24 are set to be consistent with light transmission axis of the second polarizer 20, i.e., the orientation directions of the first orientation layer 16 and the second orientation layer 24 are perpendicular to the light transmission axis of the first polarizer 10. Therefore, in the case that the electric field is not applied, the liquid crystal molecules are arranged in the manner that the long axis thereof are parallel with the orientation layers under the action of the orientation layers.

Figure 3:
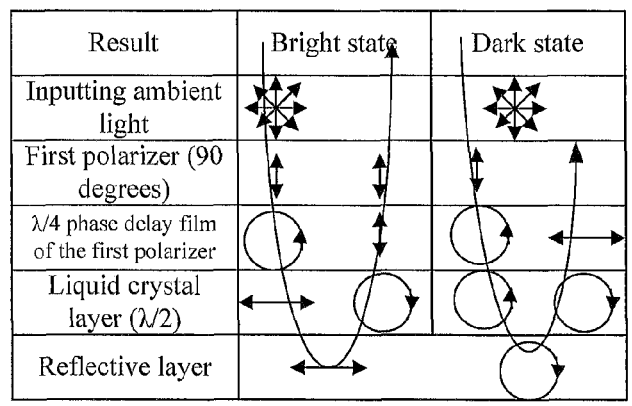
FIG. 3 is a schematic view illustrating a reflective region of the liquid crystal display panel as shown in FIG. 1 to realize a bright state and a dark state.
Figures 4, 5:
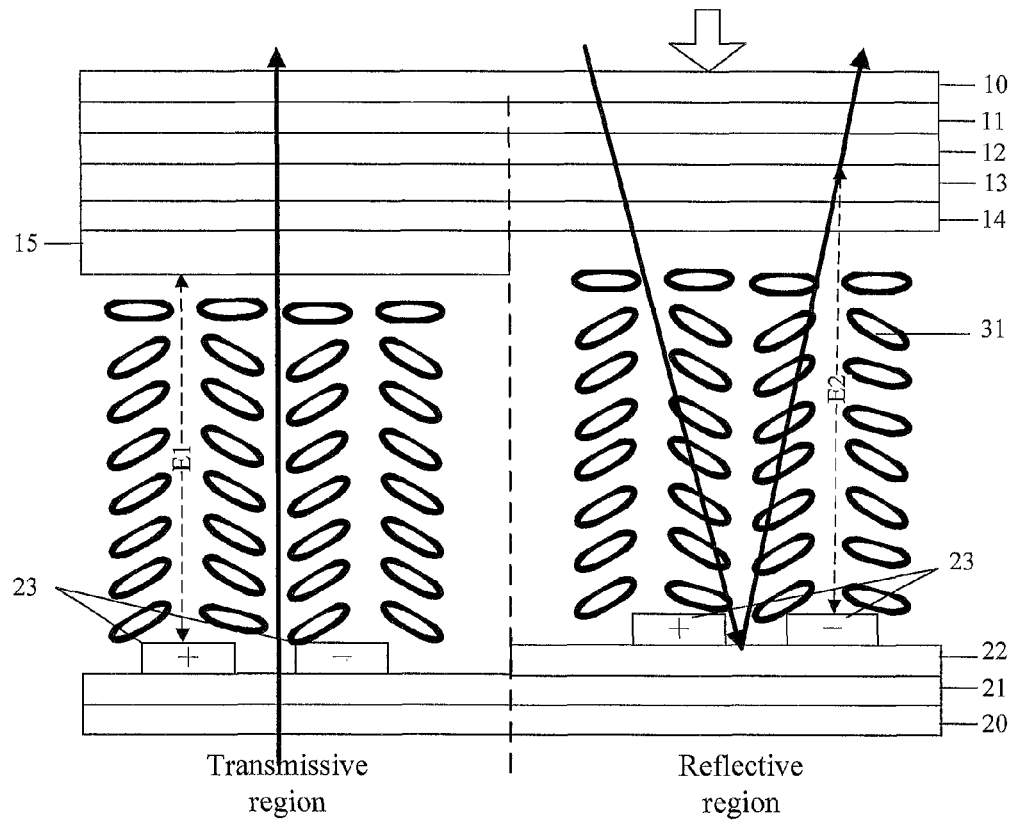
FIG. 4 is a schematic view illustrating a transmissive region of the liquid crystal display panel as shown in FIG. 1 to realize a bright state and a dark state.
FIG. 5 is a structural schematic view illustrating the transflective liquid crystal display panel as shown in FIG. 1 in the case that an electric field is applied.

FIG. 3 is a schematic view illustrating the reflective region according to the embodiments of the disclosure to realize a bright state and a dark state, and FIG. 4 is a schematic view illustrating the transmissive region according to the embodiments of the disclosure to realize a bright state and a dark state. It should be noted that, FIG. 3 and FIG. 4 illustrates the case that the polarization direction of the first polarizer 10 is a vertical direction (e.g., a 90-degree polarizer) and a polarization direction of the second polarizer 20 is a horizontal direction (e.g., a 0-degree polarizer) as an example, but the embodiments of the disclosure are not limited thereto.

As shown in FIG. 3 and FIG. 4, in conjunction with the structures of the liquid crystal display panel as mentioned above, the principle of the liquid crystal display panel realizing the bright state and the dark state are as follows.

(1) In the case that the electric field is not applied on the liquid crystal display panel, both the transmissive region and the reflective region are in the dark state, and their light simulation states are shown in the column of dark state in FIG. 3 and FIG. 4.

In the reflective region, the ambient light is natural light, which is a collection of linear polarized light in various directions; the ambient light passes through the first polarizer 10 (e.g., the 90-degree polarizer) to generate the linear polarized light parallel with the light transmission axis of the first polarizer 10, and the linear polarized light passes through the first λ/4 phase delay film to generate the left-handed circular polarized light; the left-handed circular polarized light passes through the liquid crystal layer and is not delayed because the electric field is not applied on the liquid crystal molecules of the liquid crystal layer; the left-handed circular polarized light enters into the reflective layer and is delayed by λ/2 by the reflective layer to be converted into the right-handed circular polarized light; the right-handed circular polarized light enters into the liquid crystal layer and is not delayed; the right-handed circular polarized light passes through the first λ/4 phase delay film to be converted into the linear polarized light perpendicular to the light transmission axis of the first polarizer 10; therefore, the linear polarized light does not pass through the first polarizer 10 and the dark state of the reflective region is realized.

In the transmissive region, light from the backlight passes through the second polarizer 20 (e.g., a 0-degree polarizer). The light transmission axis of the second polarizer 20 is perpendicular to that of the first polarizer 10. The light from the backlight is similar to the natural light, which is a collection of linear polarized light in various directions. The light passes through the second polarizer 20 to generate the linear polarized light parallel with the light transmission axis of the second polarizer 20; the linear polarized light passes through the second λ/4 phase delay film to generate the right-handed circular polarized light; the right-handed circular polarized light passes through the liquid crystal layer and is not delayed because the electric field is not applied on the liquid crystal molecules of the liquid crystal layer; the right-handed circular polarized light enters into the first λ/4 phase delay film and is converted into the linear polarized light perpendicular to the light transmission axis of the first polarizer 10; therefore, the linear polarized light does not pass through the first polarizer 10 and the dark state of the transmissive region is realized.

It should be noted that, in the transflective liquid crystal display panel according to the embodiments of the disclosure, the first λ/4 phase delay film and the first polarizer 10 are combined in a same optical film, and the second λ/4 phase delay film and the second polarizer 20 are combined in a same optical film as well; however, in order to clearly describe the embodiments of the disclosure, the first λ/4 phase delay film and the first polarizer 10 are separately described and the second λ/4 phase delay film and the second polarizer 20 are separately described as well. Apparently, in the embodiments of the disclosure, the λ/4 phase delay film and the polarizer may be formed separately.

(2) In the case that the electric field is applied on the liquid crystal display panel, both the transmissive region and the reflective region are in bright state, and their light simulation states are shown in the column of bright state in FIG. 3 and FIG. 4. In the case that the electric field is applied on the liquid crystal display panel, liquid crystal molecules in the liquid crystal layers of the transmissive region and the reflective region are deflected and arranged under the action of edge field effect (as shown in FIG. 5); the polarized light passes through the liquid crystal layer and generates λ/2 phase delay. The details of the case that the electric field is applied on the liquid crystal display panel are as follows.

In the reflective region, the ambient light passes through the first polarizer 10 to generate the linear polarized light parallel with the light transmission axis of the first polarizer 10; the linear polarized light passes through the first λ/4 phase delay film to generate the left-handed circular polarized light; the left-handed circular polarized light passes through the liquid crystal layer and is converted into the linear polarized light with the polarization direction perpendicular to the light transmission axis of the first polarizer due to λ/2 phase delay caused by the liquid crystal molecules in the liquid crystal layer; the linear polarized light passes through the reflective layer and is still the linear polarized light with the polarization direction perpendicular to the light transmission axis of the first polarizer after λ/2 delay of the reflective layer; the linear polarized light passes through the liquid crystal layer and is delayed by the liquid crystal layer to be converted into the right-handed circular polarized light; the right-handed circular polarized light passes through the first λ/4 phase delay film and is converted into the linear polarized light with the polarization direction parallel to the light transmission axis of the first polarizer 10; therefore, the linear polarized light passes through the first polarizer 10 and the bright state of the reflective region is realized.

In the transmissive region, the light from the backlight passes through the second polarizer 20 (e.g., a 0-degree polarizer). As the light transmission axis of the second polarizer 20 is along the horizontal direction, the light passes through the second polarizer 20 to generate the linear polarized light with the polarization direction parallel to the light transmission axis of the second polarizer 20. The linear polarized light passes through the second λ/4 phase delay film to generate the right-handed circular polarized light; the right-handed circular polarized light passes through the liquid crystal layer and is converted into the left-handed circular polarized light due to λ/2 phase delay of the liquid crystal layer; the left-handed circular polarized light enters into the first λ/4 phase delay film to be converted into the linear polarized light with the polarization direction parallel to the light transmission axis of the first polarizer 10; therefore, the linear polarized light passes through the first polarizer 10 (e.g., the 90-degree polarizer mentioned above) and the bright state of the transmissive region is realized.

According to the embodiments of the disclosure, the transflective display of the liquid crystal display panel is realized in the case that the liquid crystal display panel has a single cell thickness (i.e., the liquid crystal layer of the transmissive region has a thickness equal to that of the reflective region). Furthermore, in the case that the dark state and bright state of the transflective liquid crystal display panel are achieved, uniform and stable image are further realized through applying voltages which are equal in magnitude and opposite in polarity to the transflective liquid crystal display panel; therefore, while display on the transflective liquid crystal display panel according to the embodiments of the disclosure is realized, uniformity and stability of the displayed image are guaranteed.

Embodiments of the disclosure further provide a display device, and the display device comprises the transflective liquid crystal display panel mentioned above.

Figure 6:
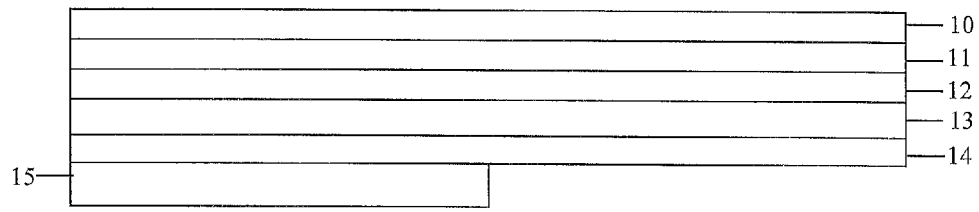
FIG. 6 is a structural schematic view illustrating a color filter substrate of the transflective liquid crystal display panel as shown in FIG. 1.

As shown in FIG. 6, embodiment of the disclosure further provide a color filter substrate, and the color filter substrate comprises: a base substrate 11, similar to the first substrate 11 in the above embodiments of the liquid crystal display panel; a first common electrode 12, arranged on a side of the base substrate facing the liquid crystal layer and corresponding to a reflective region and a transmissive region; a second common electrode 15, corresponding to the transmissive region; and a color filter film 13, arranged on a side of the first common electrode 12 facing the liquid crystal layer. The second common electrode 15 is arranged on a side of the color filter film 13 facing the liquid crystal layer.

For example, the color filter substrate further comprises a transmissive layer 14 arranged on the side of the color filter film 13 facing the liquid crystal layer; the second common electrode 15 is arranged on a side of the transmissive layer 14 facing the liquid crystal layer.

For example, a first orientation layer is provided on a side of the base substrate facing the liquid crystal layer, and the first orientation layer corresponds to the transmissive region and reflective region and covers the common electrode.

The color filter substrate according to the embodiments is applicable to the transflective liquid crystal display panel or the transflective liquid crystal display device.

Embodiments of the disclosure further provide an array substrate, and the array substrate comprises a plurality of pixel units. A plurality of pixel electrodes are provided in each pixel unit at intervals; and two adjacent pixel electrodes are equal in voltage magnitude and opposite in voltage polarity. For example, the pixel electrodes are strip-shaped electrodes or electrodes in other regular forms.

A reflective layer is provided in the reflective region of the pixel unit; the pixel electrodes of the reflective region are provided on the reflective layer.

For example, a second orientation layer is provided on a side of a base substrate of the array substrate facing the liquid crystal layer, and the second orientation layer corresponds to the transmissive region and the reflective region and covers the pixel electrodes.

The array substrate according to the embodiments is applicable to the transflective liquid crystal display panel or the transflective liquid crystal display device.

Embodiments of the disclosure further provide a method for fabricating a color filter substrate, and the method comprises steps of:

Step 11: providing a base substrate;

Step 12: forming a first common electrode and a color filter film in a transmissive region and a reflective region of the base substrate;

Step 13: forming a second common electrode in the transmissive region of the base substrate.

For example, the step 12 comprises:

Step 121: forming the first common electrode in the transmissive region and the reflective region of the base substrate;

Step 122: forming the color filter film on the first common electrode.

For example, the step 13 comprises:

Step 131: forming the second common electrode on the color filter film in the transmissive region.

For example, before the step 13, the method further comprises step 123 of forming a transmissive layer on the color filter film. Correspondingly, the step 13 comprises: forming the second common electrode on the transmissive layer in the transmissive region.

The fabrication method according to the embodiments is applicable to fabricate the color filter substrate which is adopted by the liquid crystal display panel or the display device and is used for achieving the transflective display effect.

The foregoing embodiments merely are exemplary embodiments of the disclosure, and not intended to define the scope of the disclosure, and the scope of the disclosure is determined by the appended claims.

What is claimed is:

1. A transflective liquid crystal display panel, comprising a first substrate; a second substrate arranged opposite to the first substrate; and a liquid crystal layer disposed between the first substrate and the second substrate; wherein, the liquid crystal display panel comprises a plurality of pixel units, each pixel unit comprises a transmissive region and a reflective region, and a thickness of the liquid crystal layer in the transmissive region is equal to a thickness of the liquid crystal layer in the reflective region;

on a side facing the liquid crystal layer, the first substrate is provided with a first common electrode corresponding to the reflective region and the transmissive region and a second common electrode corresponding to the transmissive region, and the first common electrode and the second common electrode are provided on a same side of the liquid crystal layer;

the second substrate is provided with a pixel electrode corresponding to the transmissive region and the reflective region on a side facing the liquid crystal layer, and the second substrate is provided with a reflective layer corresponding to the reflective region on the side facing the liquid crystal layer, and the reflective layer is provided below the pixel electrode of the reflective region; and the second common electrode and the first common electrode are configured that a first electric field intensity between the second common electrode and the pixel electrode of the transmissive region is twice a second electric field intensity between the first common electrode and the pixel electrode of the reflective region.

2. The transflective liquid crystal display panel according to claim 1, wherein
the pixel electrode in the pixel unit comprises a plurality of pixel electrodes arranged at intervals, and two adjacent pixel electrodes are equal in voltage magnitude and opposite in voltage polarity.

3. The transflective liquid crystal display panel according to claim 1, wherein
a color filter film is provided on a side of the first common electrode facing the liquid crystal layer; and the second common electrode is provided on a side of the color filter film facing the liquid crystal layer.

4. The transflective liquid crystal display panel according to claim 1, wherein
a color filter film is provided on a side of the first common electrode facing the liquid crystal layer; a transmissive layer is provided on a side of the color filter film facing the liquid crystal layer; the second common electrode is provided on a side of the transmissive layer facing the liquid crystal layer.

5. The transflective liquid crystal display panel according to claim 1, wherein
the first substrate is further provided with a first polarizer on a side away from the liquid crystal layer; and the second substrate is further provided with a second polarizer on a side away from the liquid crystal layer.

6. The transflective liquid crystal display panel according to claim 5, wherein
a light transmission axis of the first polarizer is perpendicular to that of the second polarizer.

7. The transflective liquid crystal display panel according to claim 5, wherein
both the first polarizer and the second polarizer are polarizers with a λ/4 phase delay films built therein.

8. The transflective liquid crystal display panel according to claim 2, wherein
the pixel electrodes are strip-shaped electrodes.

9. The transflective liquid crystal display panel according to claim 1, wherein a first orientation layer is provided on a side of the first substrate facing the liquid crystal layer and the first orientation layer corresponds to the transmissive region and reflective region and covers the second common electrode; and a second orientation layer is provided on a side of the second substrate facing the liquid crystal layer and the second orientation layer corresponds to the transmissive region and reflective region and covers the pixel electrode.

10. The transflective liquid crystal display panel according to claim 2, wherein
a color filter film is provided on a side of the first common electrode facing the liquid crystal layer; and the second common electrode is provided on a side of the color filter film facing the liquid crystal layer.

11. The transflective liquid crystal display panel according to claim 2, wherein
a color filter film is provided on a side of the first common electrode facing the liquid crystal layer; a transmissive layer is provided on a side of the color filter film facing the liquid crystal layer; the second common electrode is provided on a side of the transmissive layer facing the liquid crystal layer.

12. The transflective liquid crystal display panel according to claim 6, wherein
both the first polarizer and the second polarizer are polarizers with a λ/4 phase delay films built therein.

13. A color filter substrate, comprising:
a base substrate;
a first common electrode, provided on a side of the base substrate facing a liquid crystal layer and corresponding to a reflective region and a transmissive region;
a second common electrode, corresponding to the transmissive region; and
a color filter film, provided on a side of the first common electrode facing the liquid crystal layer,
wherein the second common electrode is provided to be closer to the liquid crystal layer than the first common electrode.

14. The color filter substrate according to claim 13, wherein
the second common electrode is provided on a side of the color filter film facing the liquid crystal layer.

15. The color filter substrate according to claim 13, wherein
the color filter substrate further comprises: a transmissive layer provided on a side of the color filter film facing the liquid crystal layer; and the second common electrode is provided on a side of the transmissive layer facing the liquid crystal layer.

* * * * *